June 12, 1956 L. P. CROSMAN 2,750,114

REVERSIBLE ACCUMULATOR

Filed Sept. 21, 1949 5 Sheets-Sheet 1

*INVENTOR.*
LORING P. CROSMAN
*BY* Ralph W. E. Bitner
ATTORNEY

June 12, 1956 L. P. CROSMAN 2,750,114

REVERSIBLE ACCUMULATOR

Filed Sept. 21, 1949 5 Sheets-Sheet 2

INVENTOR.
LORING P. CROSMAN
BY Ralph W. E. Bitner
ATTORNEY

June 12, 1956 L. P. CROSMAN 2,750,114

REVERSIBLE ACCUMULATOR

Filed Sept. 21, 1949 5 Sheets-Sheet 3

INVENTOR.
LORING P. CROSMAN
BY Ralph W. E. Bitner
ATTORNEY

June 12, 1956 L. P. CROSMAN 2,750,114

REVERSIBLE ACCUMULATOR

Filed Sept. 21, 1949 5 Sheets-Sheet 4

INVENTOR.
LORING P. CROSMAN
BY

ATTORNEY

June 12, 1956 L. P. CROSMAN 2,750,114

REVERSIBLE ACCUMULATOR

Filed Sept. 21, 1949 5 Sheets-Sheet 5

*INVENTOR.*
LORING P. CROSMAN

*BY* Ralph W. E. Bitner

ATTORNEY

United States Patent Office 2,750,114

Patented June 12, 1956

2,750,114

REVERSIBLE ACCUMULATOR

Loring P. Crosman, Darien, Conn., assignor to Sperry Rand Corporation, a corporation of Delaware Application September 21, 1949, Serial No. 116,991

8 Claims. (Cl. 235—92)

This invention relates to electronic storage devices or accumulators, which add or subtract numbers. It has particular reference to a system of electronic trigger stages which may be controlled to add or subtract numbers by means of auxiliary electronic switching stages. While the invention is subject to a wide range of applications, it is especially suited for use in electronic calculators which multiply and divide by repeated addition and subtraction.

Prior art electronic accumulators have generally subtracted by adding the complement of the number or by some other scheme using complements. It has been found that a direct subtraction method is easier to control and generally is less complex than a complement arrangement.

One of the objects of the invention is to provide an electronic accumulator which can add or subtract and which avoids one or more of the disadvantages and limitations of prior art accumulators.

Another object of the invention is to reduce the time of adding or subtracting a number in an electronic accumulator.

Another object of the invention is to simplify the wiring and construction of electronic accumulators.

The invention comprises a series of trigger stages which act as the accumulator of digits. These trigger stages may be arranged in any of the usual systems of notation, such as decimal, biquinary, or binary. Associated with each trigger stage is a switching stage which may be controlled by selective biasing, to route a counting pulse to the next higher trigger stage or to the next lower stage. A switching gate stage is also associated with the carry stage to add or subtract a unit digit in the next higher order when a "one" is added to a "nine" or a "one" is subtracted from a "zero."

The accumulator system used in the following description is a biquinary system and has been disclosed in a copending application, S. N. 37,652, filed July 8, 1948, now Patent No. 2,579,174. The carry system and its associated pulse generating equipment has been disclosed in another copending application, S. N. 83,378, filed March 25, 1949, now Patent No. 2,706,597.

During the operation of the circuit, values are entered into the accumulator by sending pulses to an arrangement of trigger stages. If the entered amount is to be added to the amount already in the accumulator, one set of control electrodes in the gate stages is given a voltage bias far below the cut-off value, while another set of control electrodes is biased at the cut-off value. If the entered amount is to be subtracted from the amount already in the accumulator, the bias voltages on the sets of control electrodes are interchanged.

For a better understanding of the present invention, together with other and further objects thereof, reference is made to the following description taken in conjunction with the accompany drawings.

Figure 1:
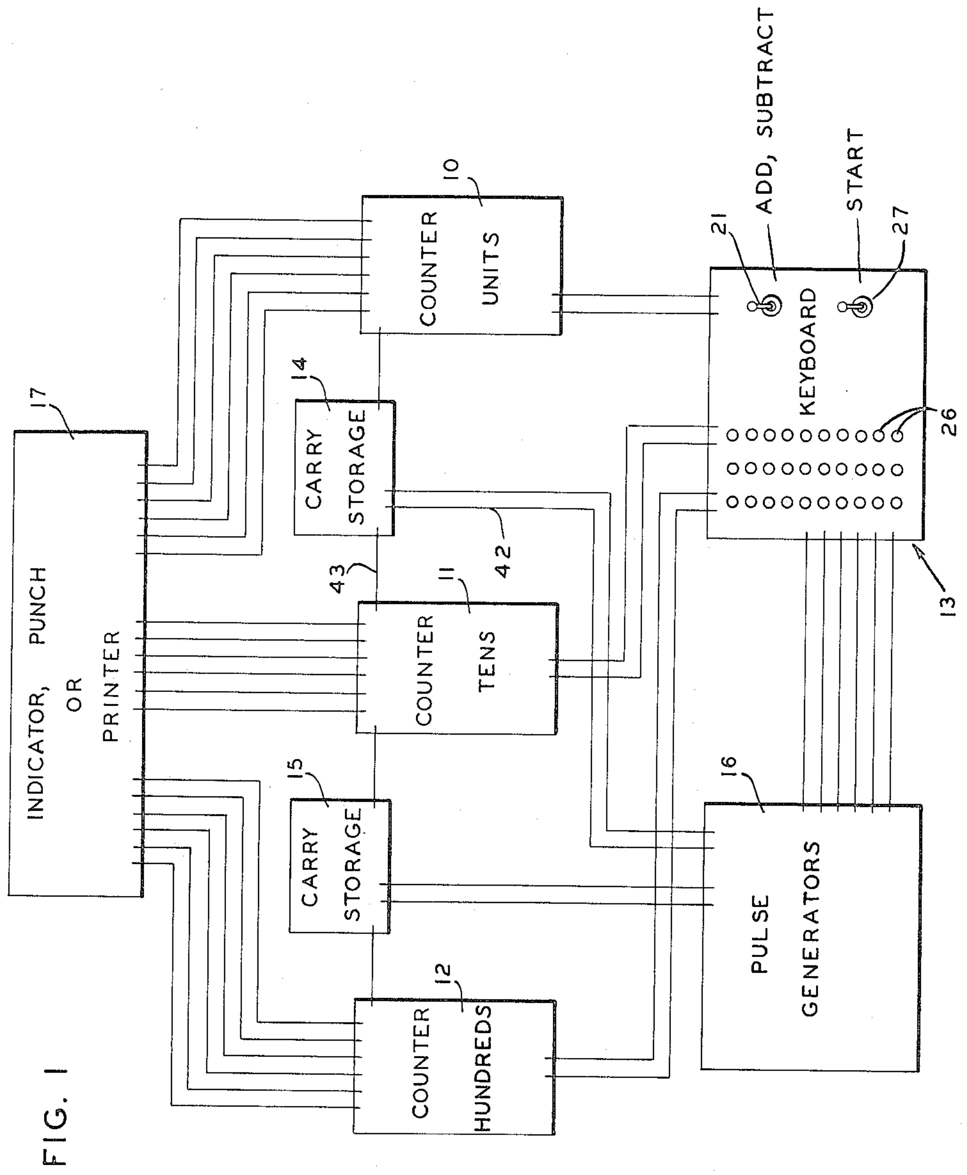
Fig. 1 is a block diagram of a complete electronic adding-subtracting machine with three denominational orders.

Referring now to Fig. 1, the adding machine includes three accumulators 10, 11, and 12, which are used to record the values entered into a keyboard 13. Between the units counter 10 and the tens counter 11 is a carry storage stage 14 and between the tens counter 11 and the hundreds counter 12 is a second carry stage 15. To send pulses through the keyboard to operate counters a pulse generator 16 is used, and to actuate the carry storage stages to cause them to transfer a stored carry to the next higher accumulator another pulse generator is used but generally housed in the same container 16.

An indicator 17 is connected to the three counter units to show at all times the total values which have been stored in the counter units. Associated with the indicator may be some other recording device such as a printer, punch or typing machine to make a permanent record of the total or sub-total values.

Figure 2:
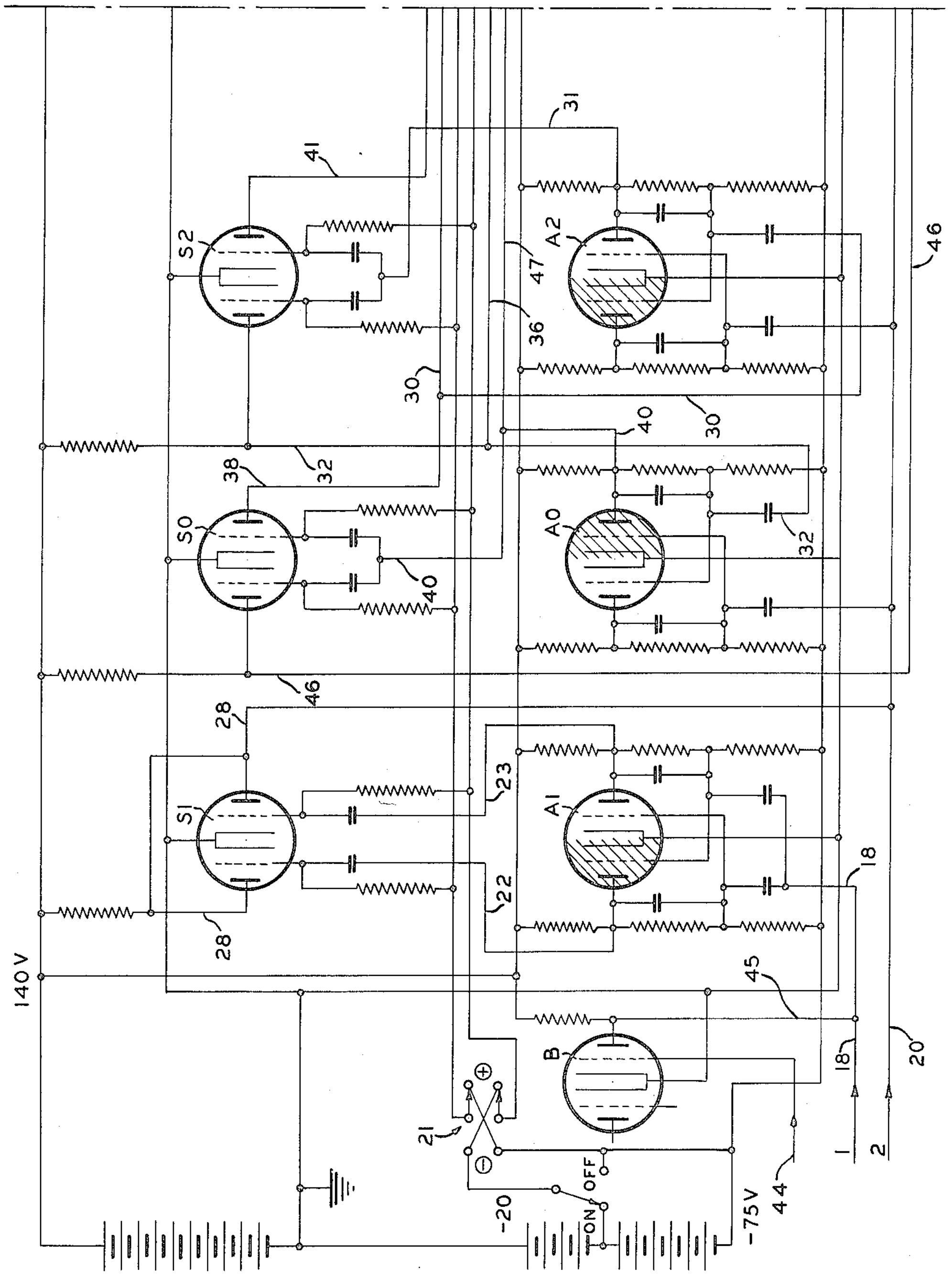
Fig. 2 is a schematic diagram of connections of part of the accumulator having the add-subtract feature.
Figure 3:
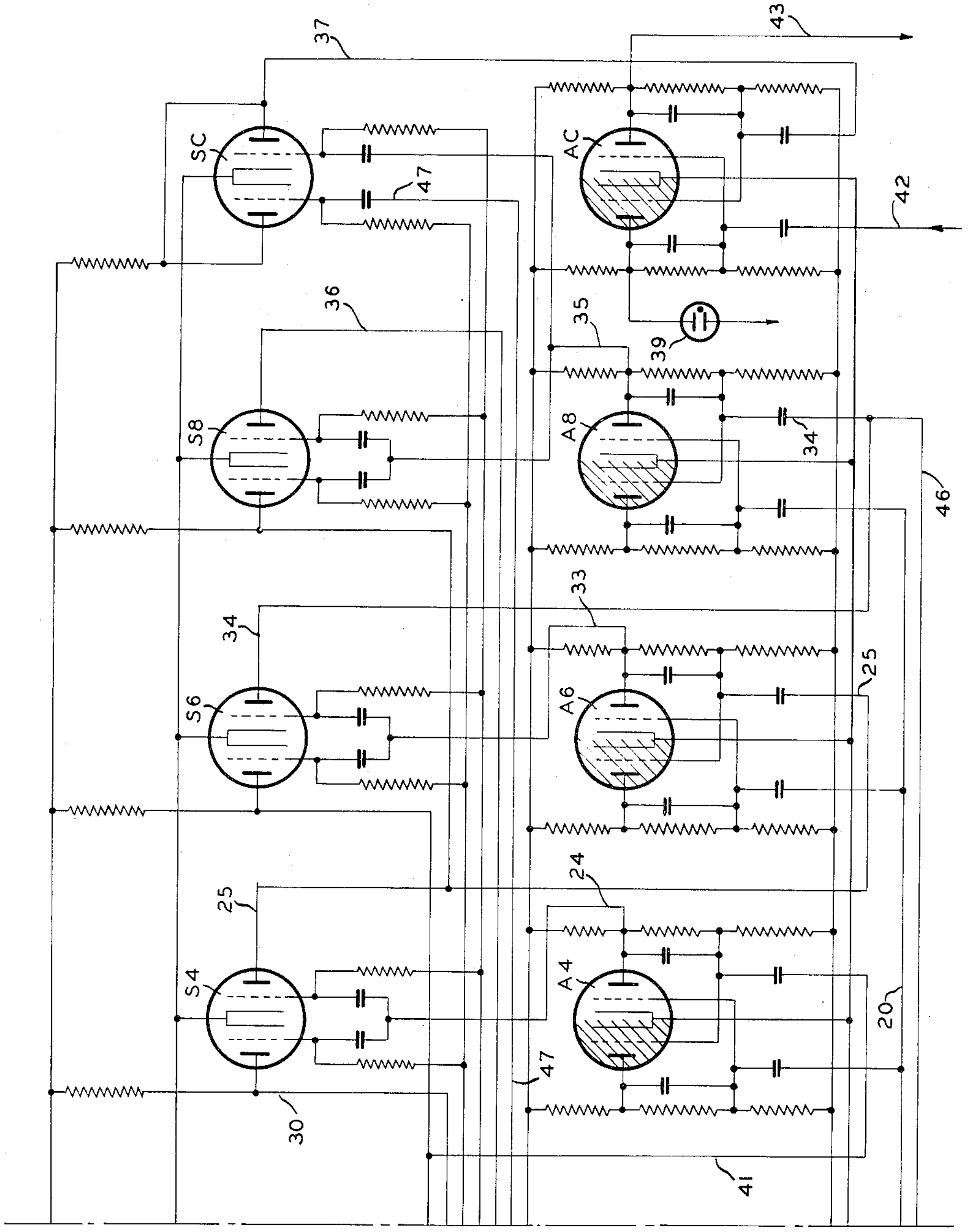
Fig. 3 is a schematic drawing of the remaining part of the accumulator which should be viewed along side of Fig. 2.

Figs. 2 and 3, which should be viewed together, show the detailed wiring arrangement of a complete counter unit plus the carry storage stages. The lower row of electronic tubes, A–1, A–0, A–2 . . . A–8, and AC represent the accumulator stages plus one carry stage. The upper row of tubes S–1, S–0, S–2 . . . S–8, and SC represent the gate switching stages plus an auxiliary switching carry stage which are required if direct subtraction is to be done, as well as addition. Stage B is a buffer amplifier and inverter tube. It is not necessary in the lowest order counter, but is used in the higher order counters to insert carry values which have been received from the next lower order counter.

The accumulator stages are double triode trigger stages and in their normal or unactuated condition are conducting on the left side. When the accumulator is cleared, i. e., registers the value zero, all trigger stages are unactuated except the zero stage A0 which is actuated (conducting on the right). This conduction pattern is established by a clearing means (not shown) which actuates A0 and restores all other triggers to an unactuated condition. To enter a "one" into the accumulator, a single pulse is sent over conductor 18 to both control electrodes of stage A1. To enter a "two" into the accumulator, a single pulse is sent over conductor 20 to the right control electrodes of stages A0, A2, A4, A6, and A8.

The seven gate switching stages S1 . . . SC are a series of double triode tubes which either transmit a pulse or block it, depending upon the voltage bias of the control electrodes. When the circuit is turned off, the voltage bias on all control electrodes is 75 volts negative with respect to ground and no pulse can get through the switching stages. When the accumulator is arranged to add the entered amounts, the left control electrode of all gate tubes is biased at −75 volts and the right control electrode of all tubes is biased at −20 volts, thereby permitting pulses to be transmitted through the right anode connections.

When the accumulator is arranged to subtract the entered amounts, the bias voltages are interchanged, the −20 volts is applied to all the left control electrodes of the gate tubes, and the −75 volts is applied to all the right control electrodes.

The accumulator circuit shown in Figs. 2, 3, 4, and 5 is a biquinary system comprising a radix two section and a radix five section. The switching circuits can be adapted to other systems of notation, such as the binary system, since the principle involved is a switching action to a higher or lower accumulator position.

Only one accumulator order is shown in the detailed drawings because the adding or subtracting circuit is complete within each order and does not extend to other parts of the device. The control switch which arranges the circuit to add or subtract controls all the accumulator orders and gives each order the same value of bias voltages.

The novel features of the electrical connections and the methods of attaining the result can be best disclosed by considering the operation of some specific examples.

Let it be assumed that the number 4 has been entered into the accumulator and that a 3 is to be added. The number 4 is stored by virtue of the actuation of stage A4 so that its conductance is in the right triode while all other stages, including the A0, are conducting on the left. To enter a 3 into the accumulator, a single negative pulse is sent over conductor 18 to the A1 stage and a single negative pulse (representing double value) is sent over conductor 20 to all the other stages A0 . . . A8. To add, the entered value switch 21 is thrown to the add position (to the right in Fig. 2) and a bias potential of 75 volts negative is applied to all the left control electrodes of the gate stages, S1 . . . SC, and a bias potential of 20 volts negative, the cut-off value, is applied to all the right control electrodes of the same tubes.

The single negative pulse sent over conductor 18 actuates the A1 stage, causing its conductance to be shifted to the right side. This transfer causes a positive pulse to be sent over conductor 22 to the left control electrode of stage S1 and a negative pulse to be sent over conductor 23 to the right control electrode of the same stage. Since the left control electrode is biased to —75 volts, the positive pulse has no effect. Also, the negative pulse sent to the right control electrode has no effect since the right side is biased to the cut-off value. The net result of the A1 actuation is to transfer conductance in that stage and nothing else.

The single negative pulse sent over conductor 20 is applied to all the right control electrodes of the radix-of-five stages. All stages which are conducting on the left will not be affected, but the stage conducting on the right, in this example A4, will be actuated and its conductance is transferred to the left. When the transfer is made, a positive pulse is generated at the right anode of stage A4 and sent over conductor 24 to both control electrodes of the gate stage S4. Since only the right control electrode is biased for conduction, the pulse is amplified and sent over conductor 25 (as a negative pulse) to the left control electrode of stage A6 which actuates the stage and transfers the conductance to the right side. The accumulator stages now show actuated stages A1 and A6 for a recorded value of 7.

If, in the above example, the 3 is to be subtracted from 4, the action is as follows: First, the add-subtract switch 21 is thrown to the subtract position. This provides all the left control electrodes with a potential of —20 volts and all the right electrodes with a potential —75 volts. Then, with a 3 entered into the keyboard 26 the start key 27 is thrown and the pulse generator sends a single-valued pulse over conductor 18 and a double-valued pulse over conductor 20 as before.

The negative pulse on conductor 18 is applied to counter stage A1 as before and actuates the stage, transferring the conductance to the right side. This transfer causes a positive pulse to be sent over conductor 22 to the left control electrode of stage S1 and a negative pulse is thereby sent over conductor 23 to the right control electrode of the same stage. The left control electrode is biased at —20 volts so the positive pulse is transmitted as a negative pulse from the left anode over conductor 28 to conductor 20 and all the radix-of-five counter stages. The A4 stage is the only stage in this counter that is conducting on the right and hence the only one that will be actuated by the pulse from S1. When the A4 stage is actuated, the conductance is transferred to the left side and a positive pulse is sent over conductor 24 as before to both control electrodes in stage S4. This time a negative pulse is sent from the left anode (because of the 20 volt potential on the left control electrode) over conductor 30 to the left control electrode in stage A2, transferring its conductance to the right side. The counter now has two actuated stages conducting on the right side, the A1 and the A2 representing a digit of 3.

The double-valued negative pulse is sent over conductor 20 after the above described action has been completed. The pulse is applied to all the right control electrodes of the radix-of-five counter stages but only the stage conducting on the right (A2) is actuated. The conductance of A2 is transferred to the left side, thereby sending out a positive pulse from the right anode, over conductor 31, to the control electrodes of stage S2. Due to the bias potentials only the left or subtraction part of the stage conducts and a negative pulse is sent from the left anode, over conductor 32, to the left control electrode of counter stage A0 which at this time is conducting on the left. The A0 stage is actuated, its conductance is transferred to the right hand side, and the action terminates. The result of 4 minus 3 is the actuation of stage A1 representing a digit of 1.

The above examples of addition and subtraction have been performed without any carry operations; that is, the computation was all in a single order. An operation of addition and subtraction will now be described wherein carry operations are necessary.

Let it be assumed that a 7 is registered in the counter by the actuation (conducting on the right) of stages A1 and A6. Switch 21 is thrown to the add position, thereby applying a potential of —20 volts to all the right control electrodes of the switching stages and a potential of —75 volts to all the left control electrodes. An 8 is entered into the keyboard 26 and the start key 27 thrown to the on position. The keyboard, acting through the pulse generator 16, causes four double-valued pulses to be sent over conductor 20 to each of the radix-of-five stages, each of the four pulses actuating the stage that happens to be conducting on the right at the time the pulse is applied.

The first pulse actuates stage A6, changing its conductance to the left, and sending a positive pulse over conductor 33 to both control electrodes in stage S6. A negative pulse is transmitted from the right anode (because of selective bias potentials) over conductor 34 to the left control electrode of stage A8. This stage is actuated and conducts on the right before the second pulse arrives over conductor 20.

The second pulse actuates stage A8, transferring its conductance back to the left and sending a pulse over conductor 35 to the control electrodes of the carry switching stages S8 and SC. The positive pulse sent to stage S8 is transmitted as a negative pulse over conductors 36 and 32 to the left control electrode of stage A0, actuating the stage and transferring the conductance to the right. The positive pulse sent to stage SC results in a negative pulse sent over conductor 37 to the left control electrode of carry stage AC which actuates the stage and transfers conductance to the right. When the AC stage is actuated, the potential of the left anode is raised to a value which is sufficient to light a neon lamp 39. This sends a signal to the carry impulse generator indicating that a carry unit must be transferred. At the end of the second pulse, stages A1, A0, and AC have been actuated.

The third pulse actuates stage A0, sends a positive pulse to stage S0, over conductor 40, and thereby a negative pulse over conductors 38 and 30 to actuate stage A2.

The fourth pulse actuates stage A2, sends a positive pulse to stage S2 over conductor 31, and thereby a negative pulse over conductor 41 to actuate stage A4.

A short interval after the fourth pulse has ended, an operating pulse is sent from the carry pulse generator 16 over conductor 42 to the right control electrode actuating the stage to its normal condition and sending a positive pulse over conductor 43 to buffer amplifier stage B in the next higher order. This stage receives the positive pulse by way of conductor 44 and thereby applies a negative pulse over conductors 45 and 18 to the radix-of-two stage A1. The A1 stage is actuated, thereby indicating a tens value of 1, which together with actuated stages A1 and A4 in the units order indicate an accumulated value of 15, the result of adding 7 plus 8.

The circuit details which make possible the delayed carry operation have been disclosed and claimed in United States patent application, S. N. 83,378, filed March 25, 1949, now Patent No. 2,706,597, by L. P. Crosman.

In order to describe the operation of subtraction when a carry transfer is necessary, let it be assumed that the number 25 has been recorded in the accumulator and a 7 is to be subtracted from it. The number 25 is represented by an actuated A2 stage in the tens counter and actuated stages A1 and A4 in the units counter. To subtract, switch 21 is thrown to the left (Fig. 2) applying a —20 volts to the left control electrodes of all switching stages (in all counters) and a —75 volts to all the right control electrodes.

The number 7 is now entered into the keyboard and the start switch 27 thrown. The number 7 is sent to the units counter in the form of a single-valued pulse over conductor 18 and three double-valued pulses over conductor 20. The details of the pulse generator and its control have been described in patent application S. N. 18,782, filed April 3, 1948, now Patent No. 2,512,851, by L. P. Crosman.

The single-valued pulse over conductor 18 actuates stage A1 and returns it to normal, conducting on the left. This actuation causes a positive pulse to be sent over conductor 23 and a negative pulse to be sent over conductor 22 to stage S1 but this time no further action occurs because of the bias potentials, —20 on the left and —75 on the right.

The first double-valued pulse applied over conductor 20 actuates the A4 stage because it is the only stage in the radix-of-five counter that is conducting on the right side. Actuation of the A4 stage returns the conductance to normal and sends a positive pulse over conductor 24 to the S4 switching stage. Since the left control electrode of S4 is biased for conduction, the pulse is transmitted over conductor 30 to the left control electrode of stage A2, actuating the stage and causing it to conduct on the right.

The second double-valued pulse acts in a similar manner. Stage A2 is normalized and a pulse is sent over conductor 31 to stage S2, thence over conductor 32 to the left control electrode of stage A0, actuating it and transferring its conductance to the right.

The third and last pulse from the pulse generator over conductor 20 actuates stage A0 to normal and sends a positive pulse over conductor 40 to both control electrodes of stage S0. A negative pulse is thereby sent over conductors 46 and 34 to the left control electrode of stage A8, actuating the stage to show an accumulated value of 8. At the same time the positive pulse is sent over conductor 40 to stage S0, it is also applied to the left control electrode of stage SC by way of conductor 47. If the counter were set to add, the pulse would have no effect, but due to the subtract potential of —20 volts on the left control electrode, the pulse is transmitted, as a negative pulse, over conductor 37 to the left control electrode of stage AC, thereby actuating the stage, lighting the neon lamp 39, and sending a signal to the carry impulse generator that a carry is to be made in the next higher order.

A short time after the last pulse has been transmitted over conductor 20, the carry impulse generator sends a negative pulse over conductor 42 to actuate stage AC to normal, and thereby sends a positive pulse over conductor 43 to stage B in the next higher counter. The pulse is inverted in this stage and is sent over conductors corresponding to 45 and 18 to the A1 stage in that counter. Conductance in the A1 stage is transferred to the right side, thereby sending a positive pulse over conductor 22 to the left control electrode of stage S1. A negative pulse is thereby transmitted over conductor 28 to actuate stage A2, the only stage in the tens counter which has been conducting on the right. The A2 stage is normalized, a positive pulse is sent to stage S2 over conductor 31, thereby sending a negative pulse to the left control electrode of stage A0 over conductor 32, and actuating the stage to conduct on the right.

The accumulator now indicates a 1 in the tens counter because of actuated stage A1 and an 8 in the units order because of actuated stage A8. The result of 25 minus 7 is, therefore, 18.

Figure 4:
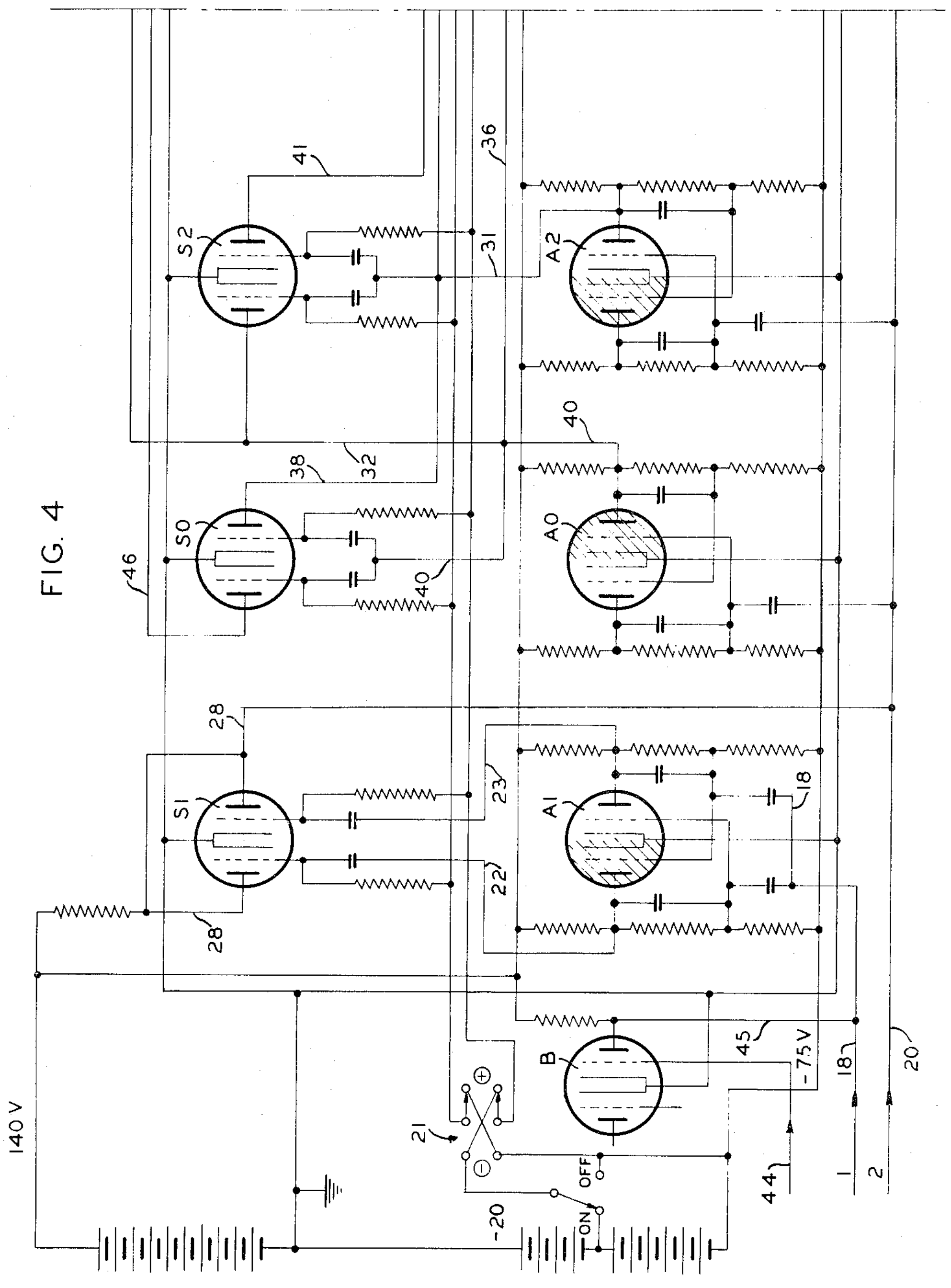
Figs. 4 and 5 are also schematic diagrams which should be viewed together, and represent a simplified wiring arrangement, but generally similar to the arrangement of Figs. 2 and 3.
Figure 5:
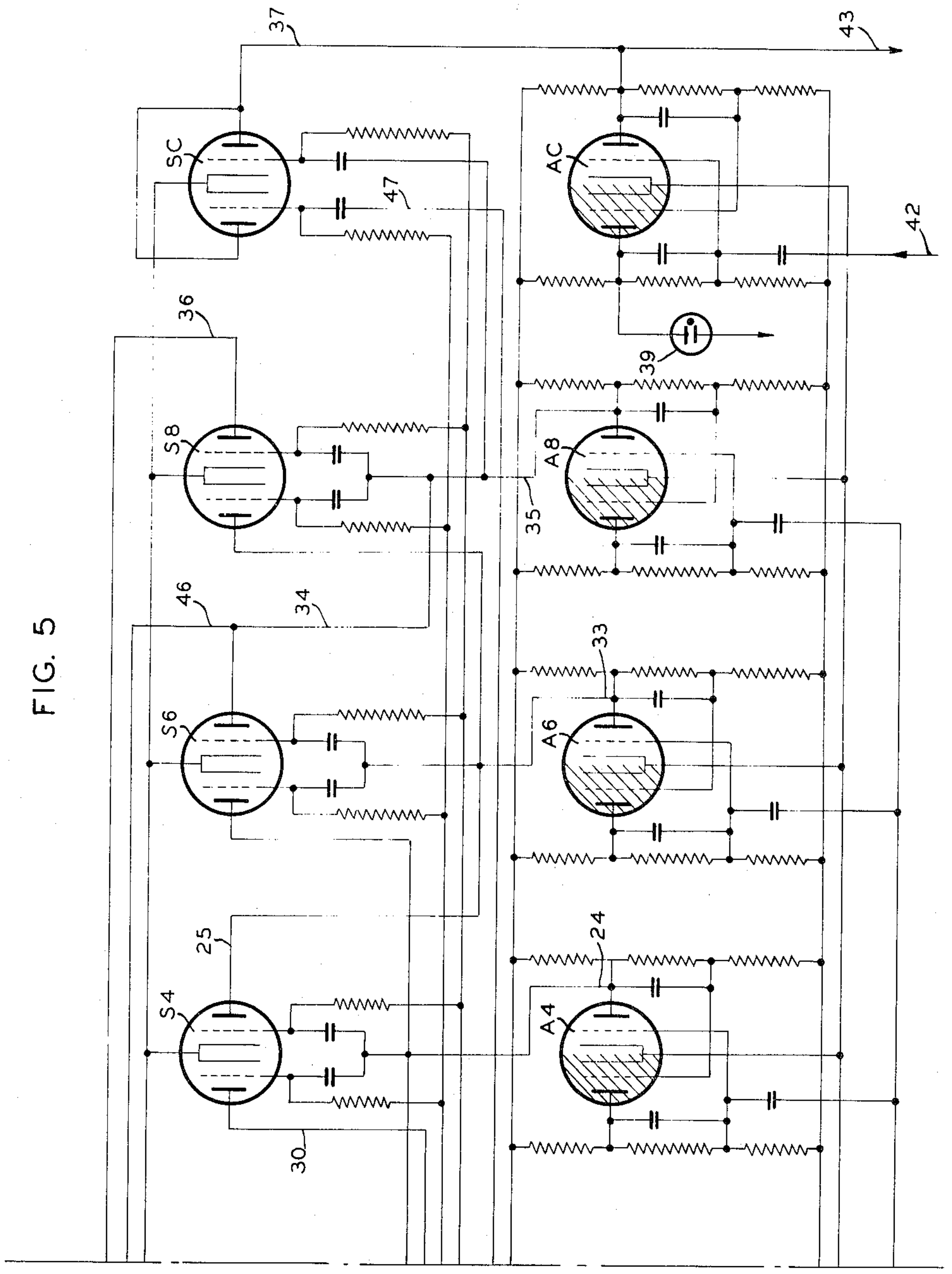

The alternate circuit shown in Figs. 4 and 5 operates in the same manner as the circuit shown in Figs. 2 and 3, except that the negative pulses from the radix-of-five switching stages are applied to the anodes of the counter stages instead of the control electrodes. This alternate method of wiring eliminates six anode resistors and six blocking capacitors. It is a well known fact that trigger stages may be actuated by lowering the potential of the conducting anode.

From the above description it will be evident that the invention provides an accumulator that can add or subtract in accordance with controlled potentials applied to switching stages. The addition of these stages does not consume additional time and provides an accurate method of adding and subtracting which can be extended to include the problems of multiplying and dividing.

While there have been described and illustrated specific embodiments of the invention, it will be obvious that various changes and modifications may be made therein without departing from the field of the invention which should be limited only by the scope of the appended claims.

What is claimed is:

1. A reversible accumulator for accumulating digit values by addition or subtraction comprising, a series of electronic trigger stages which are actuated to denote an assigned digit value each of said trigger stages having at least two stable states and having an output lead manifesting its state, a corresponding series of switching stages each containing an addition triode and a subtraction triode, the control electrodes of said triodes being operatively coupled with the output lead of the corresponding trigger stage, a control circuit which biases the control electrodes of the switching stages and selectively conditions the switching stages to deliver an output signal in response to signals from said output leads of corresponding trigger stages, a connection between the addition anode of each switching stage and the next higher valued trigger stage, and a connection between the subtraction anode of each switching stage and the next lower valued trigger stage.

2. A reversible accumulator for accumulating digit values by addition or subtraction comprising, a series of electronic trigger stages which are actuated to denote an assigned digit value each of said trigger stages having at least two stable states and having an output lead manifesting its state, a corresponding series of switching stages each containing an addition triode and a subtraction triode, the control electrodes of said triodes being operatively coupled with the output lead of the corresponding trigger stage, a control circuit including a direct current source of potential which biases the control electrodes of the switching stages and selectively conditions the switching stages to deliver an output signal in response to signals from said output leads of corresponding trigger stages, a connection between the addition anode of each switching stage and the actuating circuit of the next higher valued trigger stage, and a connection between the subtraction anode of each switching stage and the actuating circuit of the next lower valued trigger stage.

3. A reversible accumulator for accumulating digit values by addition or subtraction comprising, a series of electronic trigger stages which are actuated to denote an assigned digit value each of said trigger stages having at least two stable states and having an output lead manifesting its state, a corresponding series of switching stages each containing an addition triode and a subtraction triode, the control electrodes of said triodes being operatively coupled with the output lead of the corresponding trigger stage, a control circuit including a direct current source of potential which biases the control electrodes of the switching stages and selectively conditions the switching stages to deliver an output signal in response to signals from said output leads of corresponding trigger stages, a connection between the addition anode of each switching stage and the actuating control electrode of the next higher valued trigger stage, and a connection between the subtraction anode of each switching stage and the actuating control electrode of the next lower valued trigger stage.

4. A reversible accumulator for accumulating digit values by addition or subtraction comprising, a series of electronic trigger stages which are actuated to denote an assigned digit value each of said trigger stages having at least two stable states and having an output lead manifesting its state, a corresponding series of switching stages each containing an addition triode and a subtraction triode, the control electrodes of said triodes being operatively coupled with the output lead of the corresponding trigger stage, a control circuit including a direct current source of potential which biases the control electrodes of the switching stages and selectively conditions the switching stages to deliver an output signal in response to signals from said output leads of corresponding trigger stages, a connection between the addition anode of each switching stage and the actuating anode of the next higher valued trigger stage, and a connection between the subtraction anode of each switching stage and the actuating anode of the next lower valued trigger stage.

5. A reversible accumulator for accumulating digit values by addition or subtraction comprising, a series of electronic accumulator trigger stages which are actuated to denote an assigned digit value each of said trigger stages having at least two stable states and having an output lead manifesting its state, a carry trigger stage for storing a unit digit value to be entered into the next higher order accumulator, a series of accumulator switching stages corresponding to the accumulator trigger stages each containing an addition triode and a subtraction triode, the control electrodes of said accumulator switching triodes being operatively coupled with the output lead of the corresponding accumulator trigger stage, a carry switching stage operatively coupling said carry trigger stage with the trigger stages manifesting the highest and lowest digits for transmitting an actuating pulse to the carry trigger stage when a digit is added to a "nine" and when a digit is subtracted from a "zero," a bias control circuit including a direct current source of potential which biases the control electrodes of the accumulator switching stages and selectively conditions the switching stages to deliver an output signal in response to signals from said output leads of corresponding trigger stages, a connection between the addition triode of each accumulator switching stage and the actuating control electrode of the next higher valued accumulator trigger stage, and a connection between the subtraction anode of each accumulator switching stage and the actuating control electrode of the next lower valued accumulator trigger stage.

6. A reversible accumulator for accumulating digit values by addition or subtraction comprising, a series of electronic accumulator trigger stages which are actuated by transferring conductance from a normal condition to denote an assigned digit value each of said trigger stages having at least two stable states and having an output lead manifesting its state, a carry trigger stage for storing a unit digit value to be entered into the next higher order accumulator, a series of accumulator switching stages corresponding to the accumulator trigger stages each containing an addition triode and a subtraction triode, the control electrodes of said accumulator switching triodes being capacitor coupled with the output lead of the corresponding accumulator trigger stage, a carry switching stage operatively coupling said carry trigger stage with the trigger stages manifesting the highest and lowest digits for transmitting an actuating pulse to the carry trigger stage when a digit is added to a "nine" and when a digit is subtracted from a "zero," a bias control circuit including a direct current source of potential which biases the control electrodes of the accumulator switching stages and selectively conditions the switching stages to deliver an output signal in response to signals from said output leads of corresponding trigger stages, connections to the bias control circuit to bias the control electrodes of the carry switching stage to transmit or block pulses to the carry trigger stage, a connection between the addition anode of each accumulator switching stage and the actuating control electrode of the next higher valued accumulator trigger stage, and a connection between the subtraction anode of each accumulator switching stage and the actuating control electrode of the next lower valued accumulator trigger stage.

7. In combination a plurality of trigger devices comprising at least first and second input leads and an output lead, said trigger devices having at least two stable states attainable in response to signals delivered to said input leads and manifesting said state on said output lead, a corresponding plurality of pairs of addition and subtraction gating devices comprising at least first and second input leads and an output lead and responding by delivering a signal on said output lead only in the presence of coinciding signals of selected polarity at said input leads, circuits operatively coupling said trigger output leads with first input leads of corresponding pairs of gating devices, circuits operatively connected to second input leads of said gating devices and selectively conditioning said gating devices to deliver a signal at their output leads in response to signals delivered over the output leads of said trigger devices, the output leads of said addition gating devices being operatively coupled to the second input lead of the next higher order trigger device and the output leads of said subtraction gating devices being operatively coupled to the second input lead of the next lower order trigger device.

8. In combination, a first, second, and third bi-stable element, each comprising an input lead adapted to receive stimuli causing the element to assume one of its states and an output lead manifesting its state, first and second gating elements each comprising first and second input leads and an output lead and adapted to deliver an output signal in the presence of coinciding input signals of selected polarity, circuits operatively coupling the output lead of said second bi-stable element with the first input leads of said first and second gating elements, circuits operatively connected with second input leads of said first and second gating elements, said circuits alternately conditioning said gating elements to respond to signals applied to said first input leads, the output lead of said first gating element being operatively coupled with the input lead of said first bi-stable element and the output lead of said second gating element being operatively coupled with the input lead of said third bi-stable element.

References Cited in the file of this patent

UNITED STATES PATENTS

| | | |
|---|---|---|
| 2,462,275 | Morton | Feb. 22, 1949 |
| 2,500,294 | Phelps | Mar. 14, 1950 |
| 2,533,739 | Mumma | Dec. 12, 1950 |
| 2,534,287 | Marsh | Dec. 19, 1950 |
| 2,537,427 | Seid | Jan. 9, 1951 |
| 2,539,623 | Heising | Jan. 30, 1951 |

OTHER REFERENCES

"Reversible Decade Counting Circuit," Regener; Review of Scientific Instruments, vol. 17, No. 10, October 1946, pages 375–376.

"Differential Counting With Reversible Decade Counting Circuits," Martens; RSI, vol. 20, No. 6, June 1949, pages 424–425.

"Second Interim Progress Report on the Physical Realization of an Electronic Computing Instrument," by the Institute of Advanced Study at Princeton, N. J. (publicly distributed August 25, 1948); (pages 32A to 34A, and 35 to 37A).

"Third Interim Progress Report on the Physical Realization of an Electronic Computing Instrument," by the Institute of Advanced Study at Princeton, N. J. (publicly distributed August 31, 1949); pages 53 to 68, and 78 to 82).

"Fourth Interim Progress Report on the Physical Realization of an Electronic Computing Instrument," Princeton, N. J., July 1, 1948; (pages III–1, 1*a*, 1*b*, 1*d*, III–2 through III–5).